(12) United States Patent
Kurosaki et al.

(10) Patent No.: US 10,359,086 B2
(45) Date of Patent: Jul. 23, 2019

(54) SELECTABLE ONE-WAY CLUTCH

(71) Applicant: TOYOTA JIDOSHA KABUSHIKI KAISHA, Toyota-shi, Aichi-ken (JP)

(72) Inventors: Yuki Kurosaki, Susono (JP); Hiroyuki Shioiri, Yokohama (JP); Hiroyuki Shibata, Odawara (JP); Shotaro Kato, Susono (JP); Hiroki Yasui, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 213 days.

(21) Appl. No.: 15/420,443

(22) Filed: Jan. 31, 2017

(65) Prior Publication Data

US 2017/0219026 A1 Aug. 3, 2017

(30) Foreign Application Priority Data

Feb. 2, 2016 (JP) .................................. 2016-018217

(51) Int. Cl.
| | |
|---|---|
| F16D 41/12 | (2006.01) |
| F16D 41/02 | (2006.01) |
| F16D 41/14 | (2006.01) |
| F16D 41/16 | (2006.01) |
| F16D 41/06 | (2006.01) |
| F16D 41/069 | (2006.01) |
| F16D 41/08 | (2006.01) |

(52) U.S. Cl.
CPC .................................. F16D 41/125 (2013.01)

(58) Field of Classification Search
CPC ........ F16D 41/125; F16D 41/12; F16D 41/14; F16D 41/16
See application file for complete search history.

(56) References Cited

U.S. PATENT DOCUMENTS

| | | | | |
|---|---|---|---|---|
| RE38,498 E | * | 4/2004 | Ruth ..................... | F16D 41/125 188/82.8 |
| 7,721,860 B2 | * | 5/2010 | Saka ...................... | F16D 41/16 188/82.3 |
| 8,083,042 B2 | * | 12/2011 | Samie .................... | F16D 41/16 192/43.1 |
| 8,091,696 B2 | * | 1/2012 | Wittkopp ................ | F16D 41/16 192/43.1 |

(Continued)

FOREIGN PATENT DOCUMENTS

| | | |
|---|---|---|
| JP | 2008-082478 A | 4/2008 |
| JP | 2015-202788 A | 11/2015 |

*Primary Examiner* — Charles A Fox
*Assistant Examiner* — Tinh T Dang
(74) *Attorney, Agent, or Firm* — Hunton Andrews Kurth LLP (57) ABSTRACT

A selectable one-way clutch includes: a pocket plate including a plurality of housing concave portions; a notch plate including a plurality of engaging concave portions; plate-like engaging pieces, each being housed in each of the housing concave portions; elastic members, each being provided between a bottom portion of a corresponding housing concave portion of the housing concave portions and a corresponding engaging piece of the engaging pieces; and a selector plate provided between the pocket plate and the notch plate in a rotation axis direction of the notch plate. The bottom portion of the housing concave portion includes: a first bottom surface; and a second bottom surface formed at a position deeper than the first bottom surface.

4 Claims, 5 Drawing Sheets

(56) References Cited

U.S. PATENT DOCUMENTS

| | | | |
|---|---|---|---|
| 8,267,231 B2* | 9/2012 | Holmes | B60K 6/50 |
| | | | 192/43.1 |
| 9,188,174 B2* | 11/2015 | Beiser | F16D 41/125 |
| 9,327,598 B1* | 5/2016 | Lee | F16H 3/66 |
| 9,611,905 B2* | 4/2017 | Yasui | F16D 47/04 |
| 9,683,618 B2* | 6/2017 | Shioiri | F16D 41/14 |
| 2011/0183806 A1* | 7/2011 | Wittkopp | F16D 7/028 |
| | | | 475/263 |
| 2018/0266502 A1* | 9/2018 | Shioiri | F16D 41/12 |
| 2018/0266503 A1* | 9/2018 | Shioiri | F16D 41/14 |

\* cited by examiner

REPEAT

SELECTABLE ONE-WAY CLUTCH

CROSS-REFERENCE TO RELATED APPLICATION(S)

The present application claims priority to and incorporates by reference the entire contents of Japanese Patent Application No. 2016-018217 filed in Japan on Feb. 2, 2016.

BACKGROUND

1. Technical Field

The disclosure relates to a selectable one-way clutch.

2. Related Art

Japanese Patent Application Laid-open No. 2008-082478 discloses a selectable one-way clutch including a pocket plate having struts (engaging pieces) housed in a plurality of pockets (housing concave portions), respectively, a notch plate having a plurality of notches (engaging concave portions) formed thereon, and a selector plate provided between the pocket plate and the notch plate, as one type of one-way clutch.

In a selectable one-way clutch, a plurality of window holes are formed on the selector plate in a plate thickness direction thereof, and the selector plate is rotated to switch between a state in which the struts are raised through the window holes to be engaged with the notches and a state in which the struts are pushed into the pockets by portions of the selector plate other than the window holes to release engagement between the struts and the notch plate.

Figure 8:
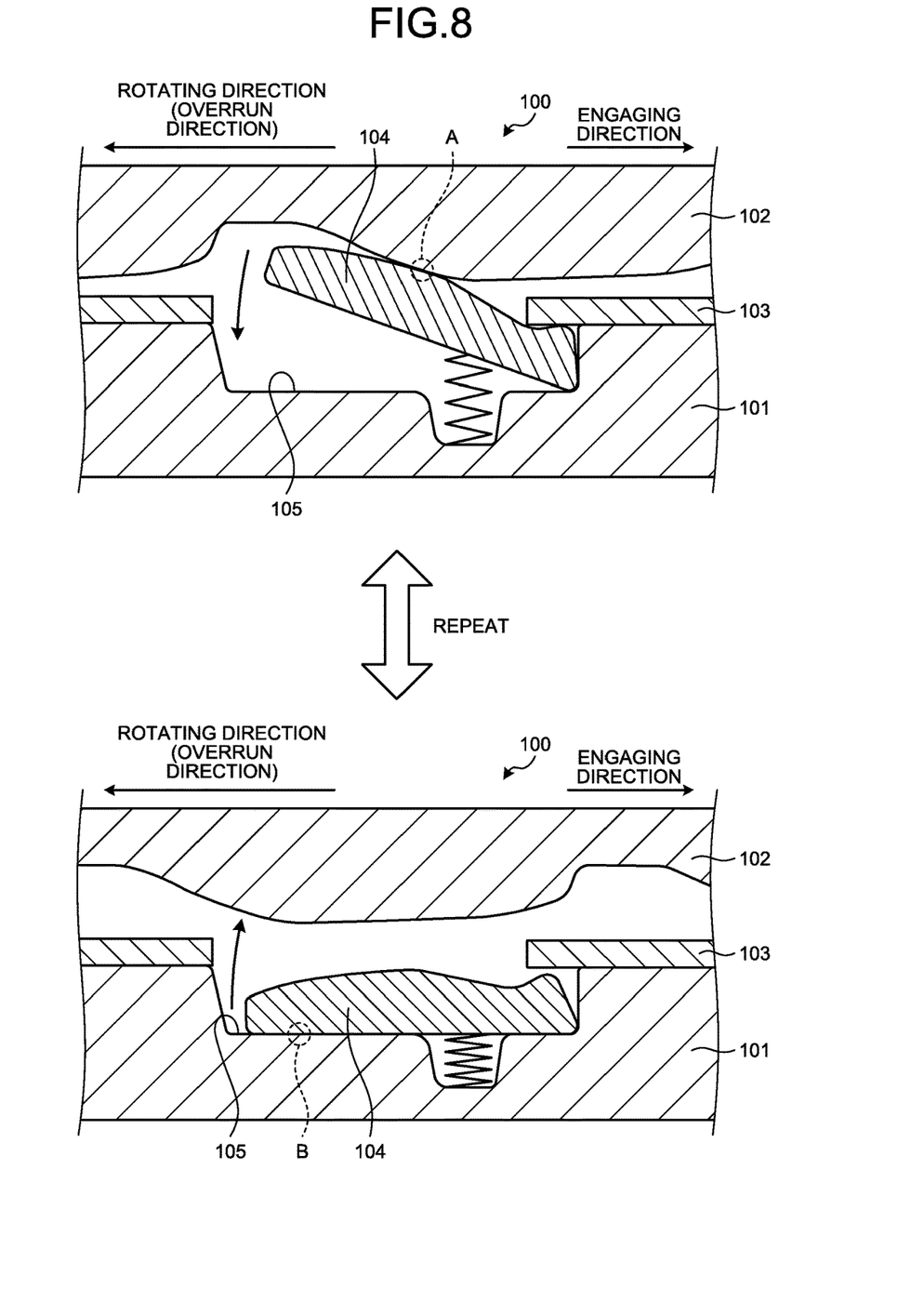
FIG. 8 is a sectional view schematically illustrating a selectable one-way clutch in a conventional configuration.

FIG. 8 is a sectional view schematically illustrating a selectable one-way clutch 100 with the conventional configuration described above. As illustrated in FIG. 8, when a notch plate 102 rotates in a direction (an overrun direction) opposite to an engaging direction in a state where struts 104 rise toward the notch plate 102 through window holes of a selector plate 103, the struts 104 are brought to a state (an overrun state) colliding with the rotating notch plate 102 without engaging with the notch plate 102. In the overrun state, there is a risk that the struts 104 alternately collide hard with the notch plate 102 and bottom portions of pockets 105 as indicated by A and B in FIG. 8 associated with rotation of the notch plate 102 and collision energy is amplified. This may shorten the life of the struts 104 and the like.

SUMMARY

It is an object of the present invention to at least partially solve the problems in the conventional technology.

According to one aspect of the disclosure, there is provided a selectable one-way clutch including: a pocket plate including a plurality of housing concave portions formed on one of surfaces of an annular plate portion; a notch plate configured to rotate relative to the pocket plate and including a plurality of engaging concave portions formed on a surface facing the surface of the pocket plate on which the housing concave portions are formed; plate-like engaging pieces, each being housed in each of the housing concave portions; elastic members, each being provided between a bottom portion of a corresponding housing concave portion of the housing concave portions and a corresponding engaging piece of the engaging pieces and being configured to bias the corresponding engaging piece toward a corresponding engaging concave portion of the engaging concave portions; and a selector plate provided between the pocket plate and the notch plate in a rotation axis direction of the notch plate and configured to rotate around an axis coaxial with an rotation axis of the notch plate to switch between a state where one end portion of the engaging piece rises toward the engaging concave portion and a state where the one end portion of the engaging piece is housed in the housing concave portion. The selectable one-way clutch is configured to: be brought to an engagement state where the one end portion of the engaging piece engages with the engaging concave portion when the one end portion of the engaging piece is in a state rising toward the engagement concave portion and the notch plate rotates in an engaging direction with respect to the pocket plate; and be brought to a disengagement state where the engaging piece do not engage with the engaging concave portion when the one end portion of the engaging piece is in a state housed in the housing concave portion or the notch plate rotates in a disengaging direction opposite to the engaging direction with respect to the pocket plate. The bottom portion of the housing concave portion includes: a first bottom surface configured to contact with one surface of the engaging piece on a side of the housing concave portion; and a second bottom surface that faces the one surface of the engaging piece on the side of the housing concave portion in a state where the engaging piece is housed in the housing concave portion and that is formed at a position deeper than the first bottom surface.

The above and other objects, features, advantages and technical and industrial significance of this invention will be better understood by reading the following detailed description of presently preferred embodiments of the invention, when considered in connection with the accompanying drawings.

DETAILED DESCRIPTION

Exemplary embodiments of a selectable one-way clutch according to the disclosure will be described below in detail with reference to the accompanying drawings.

First Embodiment

Figure 1:
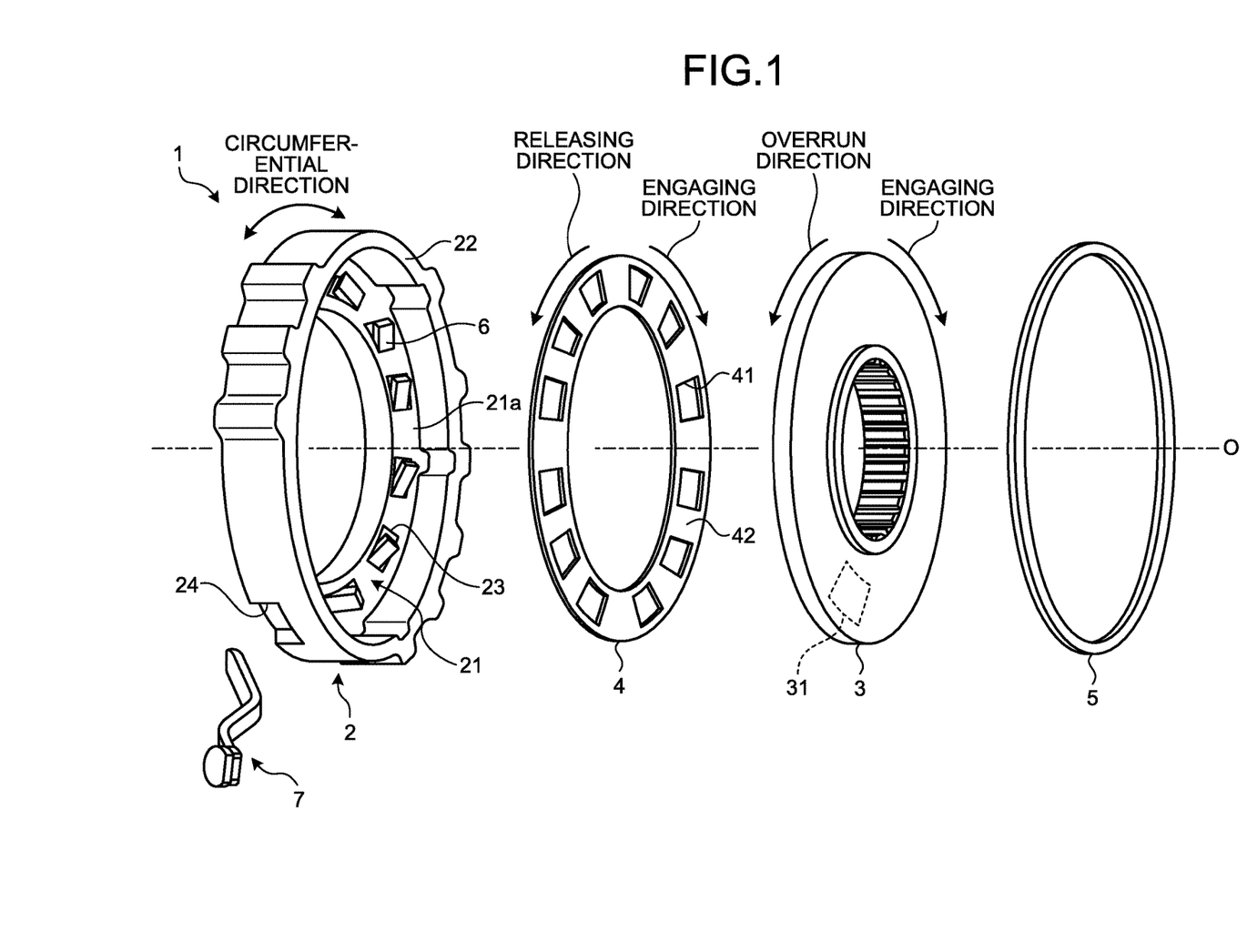
FIG. 1 is an exploded view schematically illustrating a general configuration of a selectable one-way clutch according to a first embodiment.

FIG. 1 is an exploded view schematically illustrating a general configuration of a selectable one-way clutch according to a first embodiment of the disclosure. A selectable one-way clutch (hereinafter, SOWC) 1 is mounted on, for example, a power transmission device in a hybrid vehicle and is configured to switch between an engagement state and a disengagement state by rotating a switching member (a selector plate) provided between a fixed-side plate (a pocket plate) and a rotary-side plate (a notch plate).

As illustrated in FIG. 1, the SOWC 1 includes a pocket plate 2, a notch plate 3, a selector plate 4, a snap ring 5, struts (engaging pieces) 6, and an arm 7. An "axis direction" in the following descriptions means a direction of a rotation axis O of the SOWC 1 indicated by a dashed-dotted line in FIG. 1. Furthermore, "rotation" means rotation of a rotary member on the rotation axis O.

The pocket plate 2 has a configuration in which an annular plate portion 21 and a cylindrical portion 22 extending from an outer circumferential portion of the plate portion 21 in the axis direction are molded in an integrated manner. The plate portion 21 faces the notch plate 3 and the selector plate 4 in the axis direction. The notch plate 3 and the selector plate 4 are provided inside the cylindrical portion 22 and the selector plate 4 is located between the plate portion 21 and the notch plate 3 in the axis direction. The notch plate 3 and the selector plate 4 are configured to be prevented from dropping out of the cylindrical portion 22 by the snap ring 5 fitted to an inner circumferential portion of the cylindrical portion 22. When the SOWC 1 is mounted on a power transmission device of a vehicle, lubricant oil is supplied into the SOWC 1, that is, between adjacent ones of the pocket plate 2, the selector plate 4, and the notch plate 3.

One surface (hereinafter, "inner surface") 21a of the surfaces of the plate portion 21 is an inner surface of the SOWC 1 and faces the selector plate 4 and the notch plate 3 in the axis direction. A plurality of pockets (housing concave portions) 23 are formed on the inner surface 21a at positions with a predetermined space in a circumferential direction. Each pocket 23 houses each strut 6. The pocket 23 has a shape recessed in the axis direction (a plate thickness direction of the plate portion 21). Elastic members 8 are provided between bottom portions of the pockets 23 and the struts 6, respectively (see FIG. 2). Each elastic member 8 biases the strut 6 toward the notch plate 3. A detailed configuration of the pockets 23 is described later.

The notch plate 3 is an annular rotary plate and is configured to be relatively rotatable with respect to the pocket plate 2 and the selector plate 4. A plurality of notches (engaging concave portions) 31 with which the struts 6 engage are formed on one surface (a surface facing the selector plate 4 and the pocket plate 2 in the axis direction) of the surfaces of the notch plate 3 at positions corresponding to the pockets 23 of the pocket plate 2, respectively. While only one notch 31 is illustrated in FIG. 1, the notches 31 are formed on the notch plate 3 at the positions corresponding to the pocket 23 (the struts 6) of the pocket plate 2, respectively.

The selector plate 4 is a member that switches between an engagement state and a disengagement state of the SOWC 1 and is configured to be relatively rotatable with respect to the pocket plate 2 and the notch plate 3. As illustrated in FIG. 1, on the selector plate 4 formed in an annular shape, a plurality of window holes 41 passing through the selector plate 4 in a plate thickness direction (an axis direction) are formed at positions corresponding to the pockets 23 of the pocket plate 2, respectively. Each window hole 41 is a strut pass-through hole and the window holes 41 are provided as many as the pockets 23 and the struts 6. The selector plate 4 is relatively rotated in a circumferential direction with respect to the pocket plate 2 by an actuator (not illustrated). That is, the selector plate 4 is coupled to the actuator via the arm 7.

The arm 7 is a member that transmits power output from the actuator to the selector plate 4. As illustrated in FIG. 1, a cutout portion 24 is formed on the cylindrical portion 22 of the pocket plate 2. The cutout portion 24 is provided at a position on the side of a base of the cylindrical portion 22 (the side of the plate portion 21) in the axis direction and is formed in a shape passing through the cylindrical portion 22 in a radial direction. One of end portions of the arm 7 is inserted into the cutout portion 24 from an outer side of the cylindrical portion 22 and is coupled to the selector plate 4 on the inner side of the pocket plate 2. The other end portion of the arm 7 is exposed to outside the cylindrical portion 22 from the cutout portion 24 and is coupled to the actuator. Because the cutout portion 24 has a shape obtained by cutting a part of the cylindrical portion 22 in the circumferential direction, a movable range in the circumferential direction of the arm 7 inserted into the cutout portion 24 is restricted.

For example, when the arm 7 is moved by driving the actuator, the selector plate 4 moves (rotates) in an engaging direction in the circumferential direction. The selector plate 4 rotating in the engaging direction stops at an engagement position (a position in the circumferential direction) after having rotated by a predetermined angle. The engagement position is a position where the positions of the window holes 41 substantially coincide with the positions of the pockets 23 in the circumferential direction. A return spring (not illustrated) that biases the arm 7 with a biasing force to rotate the selector plate 4 in the opposite direction is provided on the actuator. When the arm 7 is moved due to the biasing force of the return spring, the selector plate 4 moves (rotates) in a releasing direction in the circumferential direction. The selector plate 4 rotating in the releasing direction stops at a release position (a position in the circumferential direction) after having rotated by a predetermined angle. The release position is a position where the positions of the window holes 41 are deviated from the positions of the pockets 23 in the circumferential direction. As described above, the selector plate 4 is configured to reciprocate between the engagement position and the release position in the circumferential direction. As illustrated in FIG. 1, when the arm 7 contacts an end of the cutout portion 24, that is, a wall surface of the cylindrical portion 22 in the circumferential direction of the SOWC 1, movement of the arm 7 is restricted and the rotation of the selector plate 4 is stopped.

In the SOWC 1 thus configured, a state (a housing state) in which the struts 6 are housed in the pockets 23 and a state (a rising state) in which the struts 6 rise toward the notch plate 3 are switched according to positions in the circumferential direction of the selector plate 4.

When the positions of the window holes 41 are deviated from the positions of the pockets 23 in the circumferential direction of the SOWC 1 (when the selector plate 4 is located at the releasing position in the circumferential direction), the struts 6 are pushed into the pockets 23 by plate portions 42 of the selector plate 4 between the window holes 41. This state is the housing state. The plate portions 42 function as members for housing the struts 6 in the pockets 23, and close openings of the pockets 23 to prevent the struts 6 from rising. Because the notch plate 3 (the notches 31) and the struts 6 do not engage with each other in the housing state, the notch plate 3 is in a state of being rotatable in the both directions, that is, the SOWC 1 is in a release state (a disengagement state).

Figure 2:
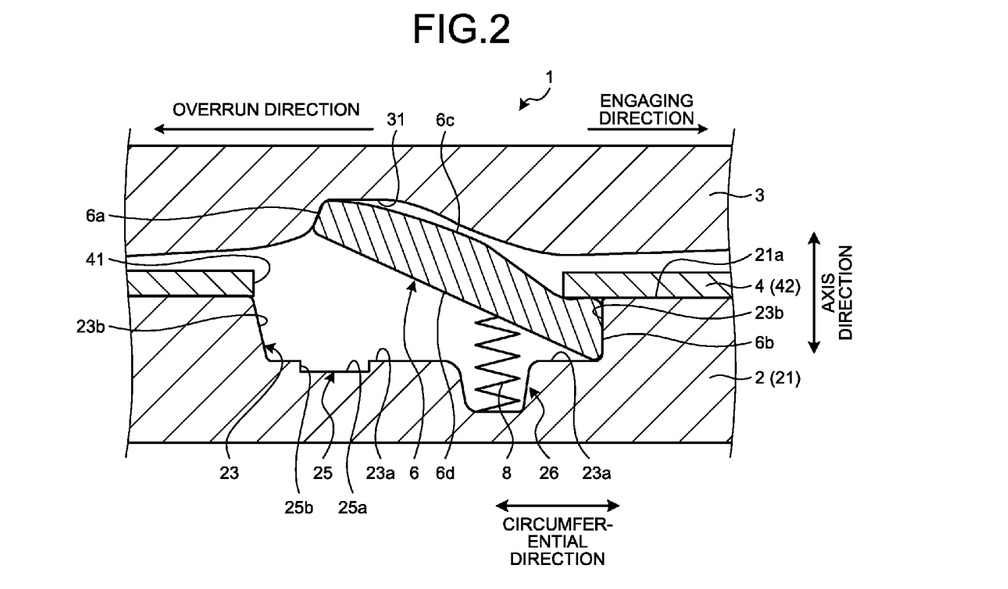
FIG. 2 is a sectional view schematically illustrating a state where a strut rises.

Meanwhile, when the positions of the window holes 41 substantially coincide with the positions of the pockets 23 in the circumferential direction of the SOWC 1 (when the selector plate 4 is in the engagement position in the circumferential direction), the struts 6 are pushed by the elastic members 8 and one end portions 6a rise toward the notch plate 3 through the window holes 41 (see FIG. 2). This state is the rising state. In the rising state, the notch plate 3 can relatively rotate with respect to the pocket plate 2 only in one direction. That is, the rising state is divided into a case where the struts 6 engage with the notch plate 3 (the engagement state) and a case where the struts 6 do not engage with the notch plate 3 (an overrun state) according to rotation directions of the notch plate 3.

1-1. Engagement State

FIG. 2 is a sectional view schematically illustrating a state where the strut 6 rises. As illustrated in FIG. 2, when the notch plate 3 rotates in the engaging direction with respect to the pocket plate 2 in a state (a rising state) where the one end portions 6a of the struts 6 rise toward the notch plate 3 through the window holes 41, the struts 6 engage with the notches 31 and rotation of the notch plate 3 in the engaging direction is restricted. In the engagement state, the one end portions 6a of the struts 6 abut on wall surfaces of the notches 31 in the circumferential direction of the SOWC 1.

On a bottom portion of each of the pockets 23, a groove 25 is formed on a first bottom surface 23a. The groove 25 is a bottom-surface concave portion recessed from the first bottom surface 23a in the axis direction (the plate thickness direction of the plate portion 21) and is formed to be rectangular in a circumferential section illustrated in FIG. 2. The circumferential section is a section cut in a direction (an axis direction) orthogonal to the circumferential direction along the circumferential direction. That is, a section as viewed in the radial direction is the circumferential section. As illustrated in FIG. 2, openings of the grooves 25 are formed on the first bottom surfaces 23a of the pockets 23. Specifically, each of the grooves 25 has a second bottom surface 25a formed at a position deeper than the first bottom surface 23a in the plate thickness direction, and a wall surface 25b formed in the plate thickness direction from the second bottom surface 25a to the first bottom surface 23a. The first bottom surface 23a and the second bottom surface 25a are flat surfaces parallel in the circumferential direction. The grooves 25 function as portions for accumulating lubricant oil 10 (not illustrated in FIG. 2) supplied into the SOWC 1. Accordingly, in the rising state of the struts 6, the lubricant oil 10 is accumulated in the grooves 25.

Furthermore, an elastic-member concave portion 26 that houses therein the elastic member 8 is formed on the bottom portion of each of the pockets 23. The elastic-member concave portion 26 is provided at a position on the side of other end portion 6b of the corresponding strut 6 in the circumferential direction of the SOWC 1.

In the circumferential section illustrated in FIG. 2, the pocket 23 is formed to include a wall surface 23b of the pocket 23, the first bottom surface 23a, the wall surface 25b of the groove 25, the second bottom surface 25a, the wall surface 25b of the groove 25, the first bottom surface 23a, the elastic-member concave portion 26, the first bottom surface 23a, and the wall surface 23b of the pocket 23 formed continuously in this order from the side of the one end portion 6a of the corresponding strut 6 to the side of the other end portion 6b thereof.

Even when the selector plate 4 is located at the engagement position as illustrated in FIG. 2, the other end portions 6b of the struts 6 are restricted by the plate portions 42 of the selector plate 4 from moving toward the notch plate 3. Accordingly, when the struts 6 are pushed toward the notch plate 3 by the biasing force of the elastic members 8, the one end portions 6a protrude toward the notch plate 3 relative to the other end portions 6b and the struts 6 rise in an attitude inclined in the circumferential direction.

1-2. Overrun State

As illustrated in FIG. 2, in a state where the one end portions 6a of the struts 6 rise toward the notch plate 3 through the window holes 41, the notch plate 3 can rotate with respect to the pocket plate 2 in a direction (an overrun direction) opposite to the engaging direction. That is, when the struts 6 rise (in the rising state) and the notch plate 3 rotates in the overrun direction, the struts 6 do not engage with the notches 31 and are in a state (an overrun state) where the notch plate 3 is rotating over the struts 6.

As illustrated in FIG. 2, the inner surface of the notch plate 3 has a shape smoothly curved with respect to the circumferential direction. Accordingly, when back surfaces 6c of the struts 6 collide with the inner surface of the notch plate 3 in the overrun state, the one end portions 6a of the struts 6 are caused to spring toward the bottom portions of the pockets 23 due to a rotating force of the notch plate 3. In this case, the one end portions 6a of the struts 6 act to approach the bottom portions of the pockets 23 against the biasing force of the elastic members 8. The struts 6 having collided with the notch plate 3 contact the bottom portions of the pockets 23 (see FIG. 3). At the time of collision between the struts 6 and the pocket plate 2, bottom surfaces 6d of the struts 6 contact the first bottom surfaces 23a provided at the bottom portions of the pockets 23. As illustrated in FIG. 2, in the plate-like strut 6, the back surface 6c is a surface on the side of the notch plate 3 (the notch 31) and the bottom surface 6d is a surface on the side of the bottom portion of the pocket 23.

Figure 3:
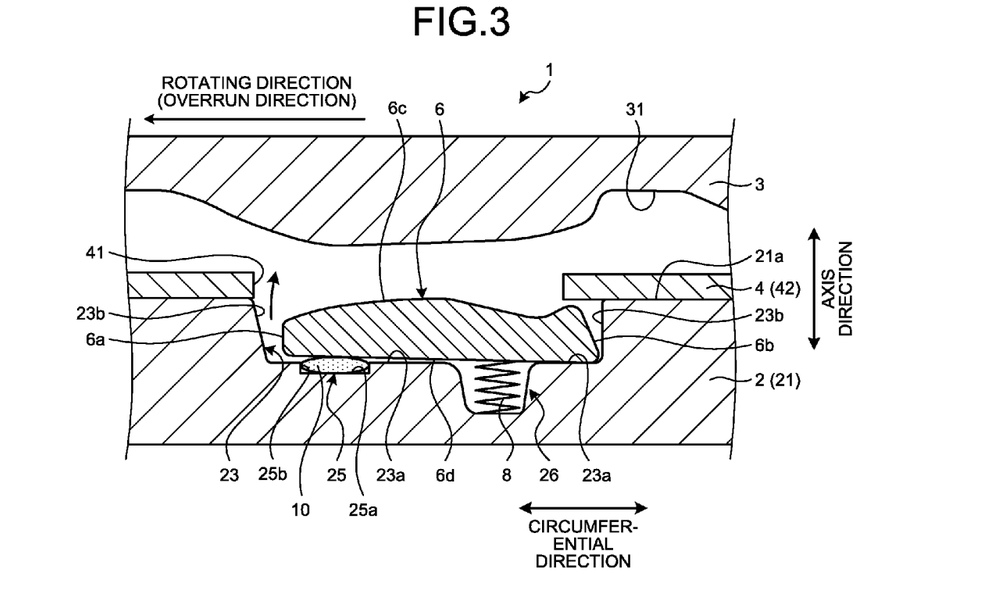
FIG. 3 is a sectional view schematically illustrating a strut immediately after contacting a bottom portion of a pocket in an overrun state.

FIG. 3 is a sectional view schematically illustrating the strut 6 immediately after contacting the bottom portion of the pocket 23 in an overrun state. As illustrated in FIG. 3, when the bottom surface 6d of the strut 6 contacts the first bottom surface 23a in the overrun state, the strut 6 is in a state of lying in the pocket 23. Although not illustrated, the strut 6 in the housing state described above is also in a state of lying in the pocket 23 while the back surface 6c of the strut 6 is in contact with the plate portion 42 of the selector plate 4. That is, in the overrun state, the struts 6 are temporarily in a state of lying in the pockets 23 similarly in the housing state of the struts 6.

For example, when the notch plate 3 rotates in the overrun direction at a high speed, the struts 6 alternately collide with the notch plate 3 and the bottom portions of the pockets 23. That is, a state where the one end portions 6a of the struts 6 are pushed by the corresponding elastic members 8 toward the notch plate 3 so that the back surfaces 6c of the struts 6 collide with the notch plate 3 (see FIG. 2) and a state where the one end portions 6a are laid in the pockets 23 so that the bottom surfaces 6d collide with the first bottom surfaces 23a of the pockets 23 (see FIG. 3) are repeated.

As illustrated in FIG. 3, in the overrun state, the bottom surfaces 6d of the struts 6 are brought into surface contact with the first bottom surfaces 23a at the time of collision of the struts 6 with the pockets 23. On the first bottom surfaces 23a, the grooves 25 are formed on the side of the one end portions 6a of the struts 6 in the circumferential direction of the SOWC 1. The lubricant oil 10 supplied into the SOWC 1 is accumulated in the grooves 25. The second bottom surfaces 25a forming the grooves 25 are located at positions facing the bottom surfaces 6d of the struts 6 in a state where the struts 6 are housed in the corresponding pockets 23, respectively. That is, the grooves 25 enable a predetermined amount or a predetermined thickness of the lubricant oil 10 to be retained in the bottom portions (particularly in a range contacted by the bottom surfaces 6d of the struts 6) of the pockets 23.

Therefore, at the time of collision of the struts 6 with the bottom portions of the pockets 23, the lubricant oil 10 is interposed between the bottom surfaces 6d of the struts 6 and the second bottom surfaces 25a. The lubricant oil 10 is also interposed between the bottom surfaces 6d and the first bottom surfaces 23a. The lubricant oil 10 has viscosity. Accordingly, as illustrated in FIG. 3, when the struts 6 rise after colliding with the first bottom surfaces 23a, the speed at which the struts 6 rise can be reduced due to the viscosity of the lubricant oil 10 interposed between the bottom surfaces 23a and 25a of the respective pockets 23 and the bottom surfaces 6d of the struts 6. That is, a resistance of the viscosity of the lubricant oil 10 acts on the struts 6 immediately after colliding with the first bottom surfaces 23a against a movement of the one end portions 6a attempting to rise.

Figure 4:
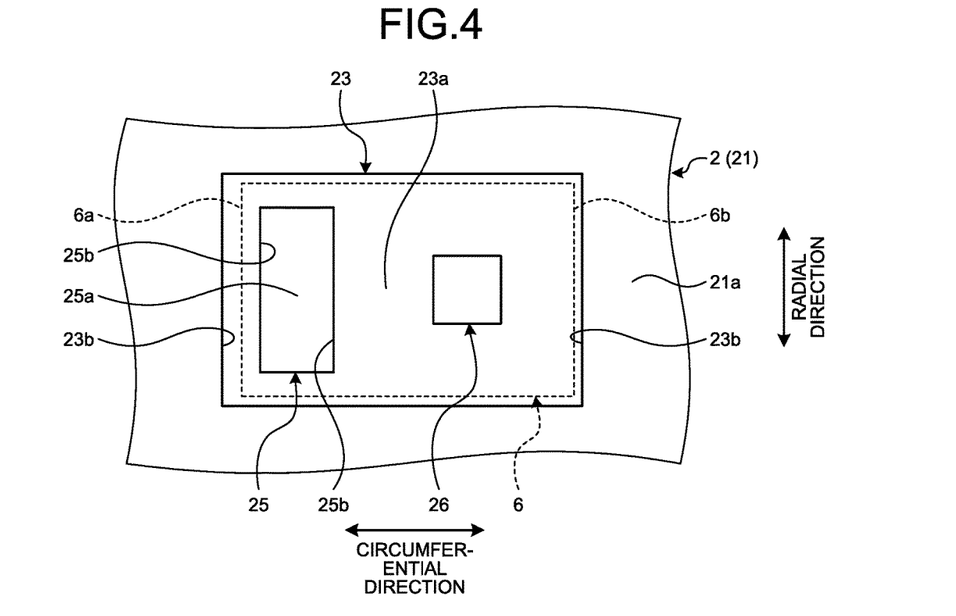
FIG. 4 is a diagram schematically illustrating the pocket as viewed in an axis direction from a side of a notch plate.

FIG. 4 is a diagram schematically illustrating the pocket 23 as viewed in the axis direction from the side of the notch plate 3. As illustrated in FIG. 4, the groove 25 is formed linearly along the radial direction of the SOWC 1 and has a predetermined groove width in the circumferential direction. The range enclosed by a broken line illustrated in FIG. 4 corresponds to a portion of the bottom portion of the pocket 23 facing the bottom surface 6d of the strut 6 in a state where the strut 6 is housed in the pocket 23. Furthermore, as illustrated in FIG. 4, when the bottom portion of the pocket 23 is viewed in the axis direction from the side of the notch plate 3, the opening of the groove 25 has a shape surrounded by the first bottom surface 23a. That is, the opening of the groove 25 is entirely covered by the bottom surface 6d of the strut 6 when the strut 6 contacts the first bottom surface 23a. Accordingly, when the struts 6 contact the first bottom surfaces 23a in the overrun state, the struts 6 can close the openings of the grooves 25 and suppress the lubricant oil 10 in the grooves 25 from flowing out of the bottom portions of the pockets 23. Therefore, even when the struts 6 repeatedly collide with the notch plate 3 and the bottom portions of the pockets 23 in the overrun state, the lubricant oil 10 can be easily retained in the bottom portions of the pockets 23 due to provision of the grooves 25 on the bottom portions of the pockets 23.

Because the grooves 25 are provided on the side of the one end portions 6a of the struts 6 in the circumferential direction of the SOWC 1, respectively, the speed at which the one end portions 6a rise can be effectively reduced by the viscosity of the lubricant oil 10. Furthermore, due to provision of the grooves 25 on the bottom portions of the pockets 23, the lubricant oil 10 in the grooves 25 may occasionally bulge to a position (a position in the axis direction) higher than the openings due to a surface tension or the like immediately before the struts 6 and the first bottom surfaces 23a collide with each other. In this case, an impact force occurring when the struts 6 collide with the bottom portions of the pockets 23 can be reduced by the viscosity of the lubricant oil 10.

As described above, according to the SOWC 1 of the first embodiment, the lubricant oil 10 can be accumulated in the grooves 25 provided on the bottom portions of the pockets 23. Accordingly, the speed at which the struts 6 rise due to rebound after collision of the struts 6 with the bottom portions of the pockets 23 in the overrun state can be reduced by the viscosity of the lubricant oil 10. Therefore, even when the struts 6 repeatedly collide with the notch plate 3 and the pocket plate 2 in the overrun state, amplification of collision energy can be suppressed and a reduction in the life of parts such as the struts 6 can be suppressed. That is, because a fluid (the lubricant oil 10) having a certain level of viscosity is interposed between the struts 6 and the pocket plate 2, an effect of attenuating the collision energy due to the viscosity can be improved.

In a case where the SOWC 1 is in the housing state (a case where the selector plate 4 is located at the release position), the speed at which the struts 6 rise can be reduced by the viscosity of the lubricant oil 10 accumulated in the grooves 25 of the pockets 23 even when the selector plate 4 is erroneously actuated in the engaging direction due to a fail or the like of the actuator and the struts 6 collide with the notch plate 3 rotating at a high speed in the overrun direction. This can improve durability of parts such as the struts 6 as countermeasures at the time of erroneous actuation of the selector plate 4.

If the thickness (the plate thickness) of the struts 6 is increased to improve the durability of the struts 6 and the like unlike the SOWC 1 according to the first embodiment described above, the mass of the SOWC 1 is increased and the mountability is reduced. That is, in the SOWC 1 of the first embodiment, the durability of the struts 6 and the like can be improved without increasing the mass or reducing the mountability.

For example, in the SOWC 100 with the conventional configuration illustrated in FIG. 8, the struts 104 are caused to rise swiftly due to collision with a pocket plate 101 (the bottom portions of the pockets 105) in an overrun state. When the speed at which the struts 104 rise increases, the speed at which the struts 104 rebound (the speed at which the struts 104 oscillate) is gradually increased due to repetitive collision with the pocket plate 101 and the notch plate 102. This amplifies collision energy of the struts 104 and there is a risk that wear and the like of the struts 104 progresses, so that the parts reach the end of the life earlier. In contrast to conventional configurations, in the SOWC 1 of the first embodiment, the speed at which the struts 6 rise can be reduced using the viscosity of the lubricant oil 10 interposed between the struts 6 and the pocket plate 2. Accordingly, in the overrun state, amplification of the collision energy due to the struts 6 can be suppressed more and the durability of the SOWC 1 can be improved more than those in conventional techniques.

As a modification of the first embodiment described above, the inner surfaces (including the second bottom surfaces 25a) of the grooves 25 can be formed in a curved shape. That is, the grooves 25 having a curved shape in a circumferential section can be formed on the bottom portions of the pockets 23.

Second Embodiment

Figure 5:
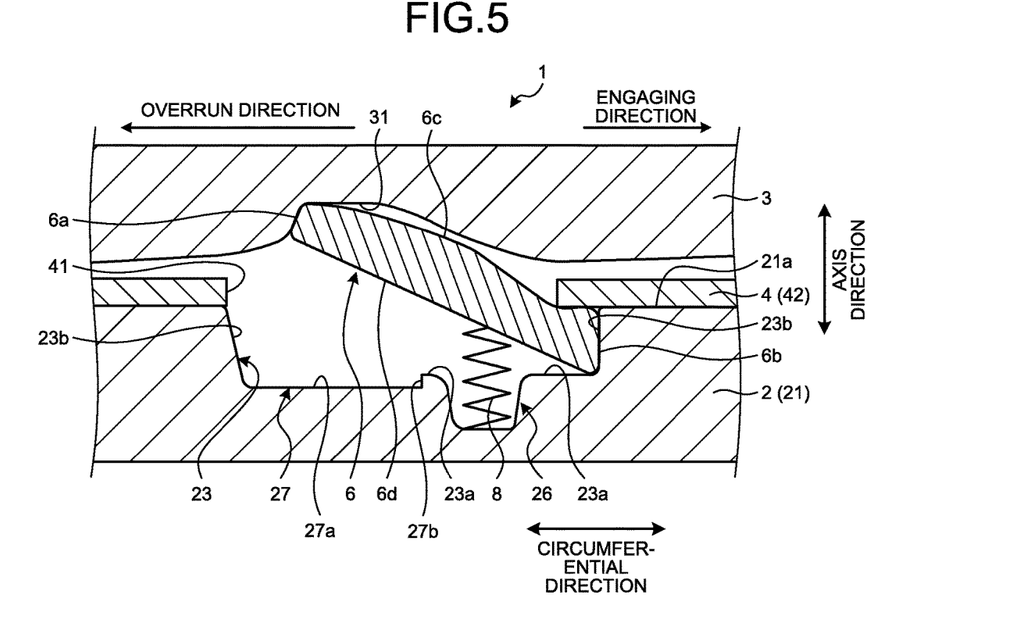
FIG. 5 is a sectional view schematically illustrating a state where a strut rises in a selectable one-way clutch according to a second embodiment.
Figure 6:
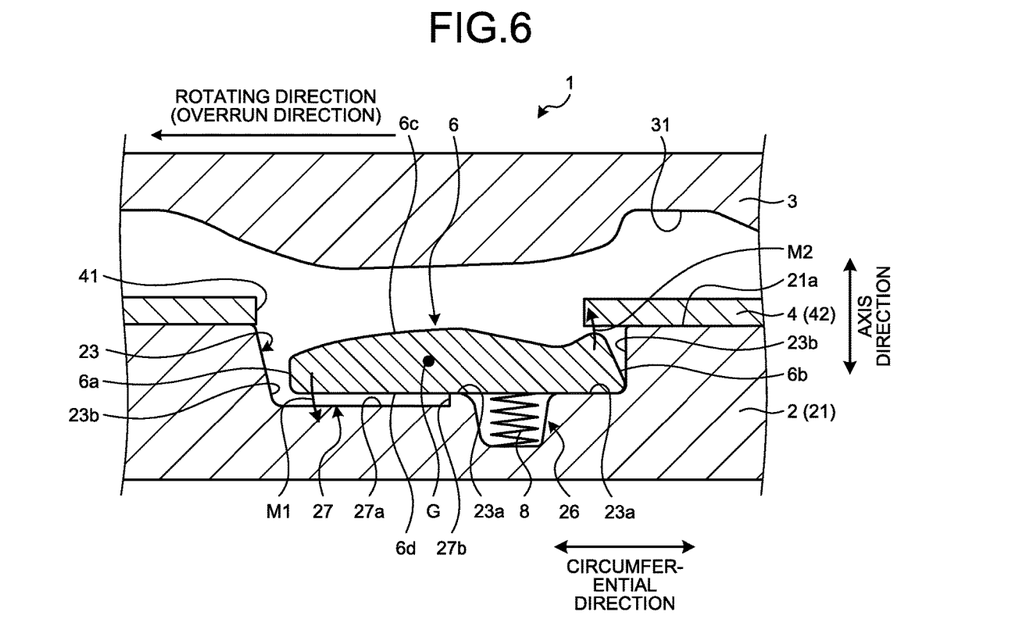
FIG. 6 is a sectional view schematically illustrating a strut immediately after contacting a bottom portion of a pocket in an overrun state.
Figure 7:
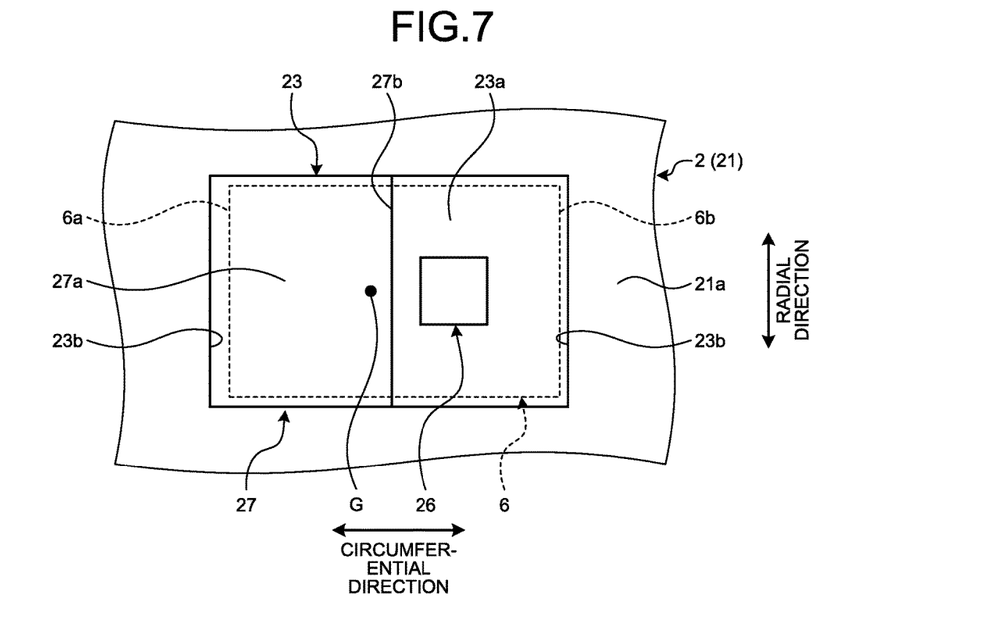
FIG. 7 is a diagram schematically illustrating a pocket as viewed in an axis direction from a side of a notch plate in the selectable one-way clutch according to the second embodiment.

The SOWC 1 according to a second embodiment of the disclosure is described next with reference to FIGS. 5 to 7. The SOWC 1 according to the second embodiment is different from the SOWC 1 according to the first embodiment in a configuration of the bottom portions of the pockets 23. FIG. 5 is a sectional view schematically illustrating a state where the strut 6 rises in the SOWC 1 according to the second embodiment. FIG. 6 is a sectional view schematically illustrating an overrun state in the second embodiment immediately after the strut 6 contacts the bottom portions of the pockets 23. FIG. 7 is a diagram schematically illustrating the pocket 23 as viewed in the axis direction from the side of the notch plate 3 in the SOWC 1 according to the second embodiment. In the descriptions of the second embodiment, explanations of constituent elements identical to those of the first embodiment will be omitted and these constituent elements are denoted by like reference signs.

In the SOWC 1 of the second embodiment, as illustrated in FIG. 5, a stepped portion 27 having a step in the plate thickness direction of the plate portion 21 is formed by the first bottom surface 23a and a second bottom surface 27a on the bottom portion of the pocket 23. As illustrated in FIG. 6, the second bottom surface 27a is formed to include a portion immediately below a position G of the gravity center of the strut 6 in a state where the bottom surface 6d of the strut 6 is in surface contact with the first bottom surface 23a. That is, the second bottom surface 27a is provided on a portion facing the bottom surface 6d of the strut 6 in a state where the strut 6 is housed in the pocket 23 (including a state where the strut 6 is temporarily laid in an overrun state). The stepped portion 27 forms a step lowering in the plate thickness direction of the plate portion 21 from the first bottom surface 23a to the second bottom surface 27a from the side of the other end portion 6b of the strut 6 to the side of the one end portion 6a thereof. Because the strut 6 is laid in a circumferential sectional view illustrated in FIG. 6, a length of the strut 6 from the one end portion 6a to the position G of the gravity center is assumed as a circumferential length. Furthermore, as illustrated in FIG. 7, the second bottom surface 27a is formed in the same range as a radial width of the bottom portion of the pocket 23.

In detail, as illustrated in FIG. 5, the stepped portion 27 has the second bottom surface 27a formed at a position deeper than the first bottom surface 23a as a bottom surface, and a wall surface 27b forming a step (a boundary) is provided between the first bottom surface 23a and the second bottom surface 27a. The wall surface 27b is provided on the side of the other end portion 6b relative to the position G of the gravity center of the strut 6 in the circumferential direction of the SOWC 1 and is formed on the entire bottom portion of the pocket 23 in the radial direction of the SOWC 1, as illustrated in FIG. 7. That is, the wall surface 27b forms a boundary between the first bottom surface 23a and the second bottom surface 27a. The second bottom surface 27a is formed to be continuous with the wall surface 23b formed on the side of the one end portion 6a of the strut 6 in the circumferential direction of the SOWC 1 as illustrated in FIGS. 5 and 6. That is, the second bottom surface 27a is formed to be longer than a length from the one end portion 6a of the strut 6 to the position G of the gravity center in a circumferential section of the SOWC 1.

In the circumferential section illustrated in FIGS. 5 and 6, the pocket 23 is formed to include the wall surface 23b of the pocket 23, the second bottom surface 27a, the wall surface 27b, the first bottom surface 23a, the elastic-member concave portion 26, the first bottom surface 23a, and the wall surface 23b of the pocket 23 which are continuous in this order, from the side of the one end portion 6a of the strut 6 to the side of the other end portion 6b thereof.

In the SOWC 1 of the second embodiment, after the bottom surfaces 6d of the struts 6 are brought into surface contact with the first bottom surfaces 23a in an overrun state, moment M1 in a direction in which the one end portions 6a lower toward the second bottom surfaces 27a, that is, moment M2 in a direction in which the other end portions 6b lift toward the notch plate 3 is generated by the stepped portions 27 of the pockets 23. In this way, the moment M2 to lift the other end portions 6b of the struts 6 is generated by the stepped portions 27 provided on the bottom portions of the pockets 23, which functions as a configuration to allow an impact force occurring at the time of collision of the struts 6 with the bottom portions of the pockets 23 to escape. Accordingly, the speed at which the one end portions 6a rise after the struts 6 collide with the bottom portions of the pockets 23 can be reduced. As illustrated in FIG. 6, clearances in the axis direction are provided between the other end portions 6b of the struts 6 and the selector plate 4, respectively.

As described above, according to the SOWC 1 of the second embodiment, the moment M2 in the direction in which the other end portions 6b of the struts 6 lift is generated after the bottom surfaces 6d of the struts 6 are brought into surface contact with the first bottom surfaces 23a in an overrun state. This enables rebound of the struts 6 to be suppressed and the speed at which the one end portions 6a of the struts 6 rise to be reduced. Accordingly, amplification of the collision energy can be suppressed when the struts 6 repeatedly collide with the notch plate 3 and the pocket plate 2 in the overrun state.

As a modification of the second embodiment described above, the second bottom surfaces 27a can be formed on a surface inclined with respect to the circumferential direction. In this case, the wall surfaces 27b described above are not formed and the first bottom surfaces 23a are formed to be continuous with the second bottom surfaces 27a as inclined surfaces.

According to the embodiments of the disclosure, a second bottom surface is provided on a bottom portion of a housing concave portion at a position facing one surface of engaging piece on the side of the housing concave portion in a state where the engaging piece is housed in the housing concave portion and being deeper than a first bottom surface. Therefore, when the engaging piece contacts the first bottom surface of the housing concave portion in a state (an overrun state) where a notch plate is rotating in a disengaging direction, lubricant oil can be interposed between the second bottom surface and the surface of the engaging piece on the side of the housing concave portion. This can reduce the speed of rising of the engaging piece due to rebound after the engaging piece collides with the first bottom surface of the housing concave portion in the overrun state. Accordingly, amplification of collision energy caused by alternate collision of the engaging piece with the notch plate and the pocket plate in the overrun state can be suppressed and a reduction in the life of parts can be suppressed.

According to the embodiments of the disclosure, lubricant oil supplied into a selectable one-way clutch can be accumulated in a bottom-surface concave portion surrounded by the first bottom surface. This enables lubricant oil to be interposed between engaging piece and the first and second bottom surfaces in an overrun state. Therefore, the speed at which one end portion of the engaging piece rises can be reduced due to viscosity of the lubricant oil.

According to the embodiments of the disclosure, the bottom-surface concave portion is surrounded by first bottom surface. Therefore, when the engaging piece contacts the first bottom surface in an overrun state, the bottom-surface concave portion is entirely covered by the engaging piece and lubricant oil accumulated in the bottom-surface concave portion can be suppressed from flowing out. This enables a certain amount of lubricant oil to be retained in a bottom portion of the housing concave portion even when the engaging piece repeatedly collides with the first bottom surface in an overrun state, and the lubricant oil can be interposed between the engaging piece and the first and second bottom surfaces.

According to the embodiments of the disclosure, a boundary between the first bottom surface and the second bottom surface is located on the side of other end portion of the engaging piece relative to a position of a gravity center of the engaging piece. Therefore, on a bottom portion of the housing concave portion, a portion facing one surface of the engaging piece on the side of the housing concave portion in a state where the engaging piece is housed in the housing concave portion, including a portion immediately below the position of the gravity center of the engaging piece is constituted of the second bottom surface. Accordingly, moment in a direction in which the other end portion of the engaging piece rises can be generated after the surface of the engaging piece on the side of the housing concave portion contacts the first bottom surface in an overrun state. This can reduce the speed at which the one end portion of the engaging piece rises after the engaging piece collides with the bottom portion of the housing concave portion.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A selectable one-way clutch comprising:
   a pocket plate including a plurality of housing concave portions formed on one of surfaces of an annular plate portion;
   a notch plate configured to rotate relative to the pocket plate and including a plurality of engaging concave portions formed on a surface of an annular plate facing the surface of the pocket plate on which the housing concave portions are formed;
   plate-like engaging pieces, each being housed in each of the housing concave portions;
   elastic members, each being provided between a bottom portion of a corresponding housing concave portion of the housing concave portions and a corresponding engaging piece of the engaging pieces and being configured to bias the corresponding engaging piece toward a corresponding engaging concave portion of the engaging concave portions; and
   a selector plate provided between the pocket plate and the notch plate in a rotation axis direction of the notch plate and configured to rotate around an axis coaxial with a rotation axis of the notch plate to switch between a state where one end portion of the engaging piece rises toward the engaging concave portion and a state where the one end portion of the engaging piece is housed in the housing concave portion,
   the selectable one-way clutch being configured to:
   be brought to an engagement state where the one end portion of the engaging piece engages with the engaging concave portion when the one end portion of the engaging piece is in a state rising toward the engaging concave portion and the notch plate rotates in an engaging direction with respect to the pocket plate; and
   be brought to a disengagement state where the engaging piece does not engage with the engaging concave portion when the one end portion of the engaging piece is in a state housed in the housing concave portion or the notch plate rotates in a disengaging direction opposite to the engaging direction with respect to the pocket plate, wherein
   the bottom portion of the housing concave portion includes:
   a first bottom surface configured to contact with one surface of the engaging piece on a side of the housing concave portion;
   a second bottom surface that faces the one surface of the engaging piece on the side of the housing concave portion in a state where the engaging piece is housed in the housing concave portion and that is formed at a position deeper than the first bottom surface; and
   an elastic-member concave portion, which differs from the second bottom surface, and is spaced apart from the second bottom surface so as to not communicate with the same, configured to house therein the elastic member.

2. The selectable one-way clutch according to claim 1, wherein a bottom-surface concave portion formed by the second bottom surface is provided on the bottom portion of the housing concave portion.

3. The selectable one-way clutch according to claim 2, wherein the bottom-surface concave portion is surrounded by the first bottom surface when the housing concave portion is viewed in the rotation axis direction from the notch plate.

4. The selectable one-way clutch according to claim 1, wherein
   a portion of the bottom portion of the housing concave portion facing one surface of the engaging piece on the side of the housing concave portion in a state where the engaging piece is housed in the housing concave portion is formed in a stepped configuration becoming deeper from the first bottom surface to the second bottom surface, from other end portion of the engaging piece toward the one end portion of the engaging piece, and
   a boundary between the first bottom surface and the second bottom surface is located on a side of the other end portion relative to a position of a gravity center of the engaging piece in a circumferential section of the plate portion.

* * * * *